US006295154B1

(12) United States Patent
Laor et al.

(10) Patent No.: US 6,295,154 B1
(45) Date of Patent: Sep. 25, 2001

(54) OPTICAL SWITCHING APPARATUS

(75) Inventors: Herzel Laor, Boulder, CO (US); Philip A. Congdon, Richardson, TX (US); Andrew S. Dewa, Plano, TX (US); David I. Forehand, Wylie, TX (US); Tsen-Hwang Lin, Dallas, TX (US); John W. Orcutt, Richardson, TX (US); James A. Sisco, Esmond, RI (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/310,284

(22) Filed: May 12, 1999

Related U.S. Application Data
(60) Provisional application No. 60/088,239, filed on Jun. 5, 1998.

(51) Int. Cl.[7] .................................................. G02B 26/08
(52) U.S. Cl. .......................... 359/223; 359/224; 359/872; 385/18
(58) Field of Search ................................... 359/223, 224, 359/872; 385/18

(56) References Cited

U.S. PATENT DOCUMENTS

| 4,512,036 | 4/1985 | Laor . |
| 4,580,873 | 4/1986 | Levinson . |
| 5,177,348 | 1/1993 | Laor . |
| 5,199,088 | 3/1993 | Magel . |
| 5,524,153 | 6/1996 | Laor . |
| 5,606,447 | * 2/1997 | Asada et al. ........................ 359/224 |
| 5,647,033 | 7/1997 | Laughlin . |
| 5,774,604 | * 6/1998 | McDonald ........................ 359/223 |
| 5,910,856 | * 6/1999 | Ghosh et al. ........................ 359/224 |

OTHER PUBLICATIONS

Article entitled "Packaged Silicon Micro Optical Deflector Using Electromagnetic Force" by I. Kawakubo et al., published in the Technical Digest of The 13th Sensor Symposium, Jun. 8–9, 1995, pp. 17–20.
Article entitled "Building Microelectromechanical–Based Optical Systems on a Silicon Chip," pp. 11–18, by K.Y. Lau, published in the MEM,'s the Word for Optical Beam Manipulation, Circuits & Devices—Jul. 1997.

* cited by examiner

*Primary Examiner*—Darren Schuberg
(74) *Attorney, Agent, or Firm*—Russell E. Baumann; Wade James Brady, III; Frederick J. Telecky, Jr.

(57) ABSTRACT

An optical matrix switch station (1) is shown mounting a plurality of optical switch units (15, 17), each of which includes a mirror (29), moveable in two axes, for purpose of switching optical beams from one optical fiber to another. A mirror assembly (41) includes a single body of silicon comprising a frame portion (43), gimbals (45), mirror portion (47), and related hinges (55). Magnets (53, 54) and air coils (89) are utilized to position the central mirror surface (29) to a selected orientation. The moveable mirror and associated magnets along with control LED's (71) are hermetically packaged in a header (81) and mounted with the air coils on mounting bracket (85) to form a micromirror assembly package (99) mounted in each optical switch unit.

38 Claims, 10 Drawing Sheets

OPTICAL SWITCHING APPARATUS

RELATED APPLICATIONS

Benefit is claimed from Provisional Application No. 60/088,239, filed Jun. 5, 1998.

FIELD OF INVENTION

This invention relates generally to a component for optical switching systems and more particularly to a component for the switching of optical signals directly, without first converting the optical signals to electronic signals.

BACKGROUND OF THE INVENTION

In recent years optical fibers have come into wide spread use in a wide variety of applications in which optical signals are transmitted along such fibers and are switched from one fiber to another by means of an optical switch. Conventional optical switches generally include fiber positioning means, alignment signal emitter means and interconnected computer control means. A fiber positioning means is provided near the end of each fiber to selectively point the end of a given fiber in one fiber group toward the end of a given fiber in another fiber group for switched optical transmission therebetween. An alignment signal emitter means is provided near an end of and in predetermined spaced relationship to the end of each fiber to emit an alignment signal for receipt and use in controlling the fiber positioning means when aligning the ends of selected fibers in the fiber groups for switched optical transmission therebetween, for example as shown in U.S. Pat. Nos. 4,512,036 and 5,177,348. This approach requires considerable complexity and duplication of alignment means for each alignable fiber. It would be very desirable to reduce this complexity and duplication and to increase speed of switching, reliability, as well as to reduce cost in implementation.

SUMMARY OF THE INVENTION

An object of the present invention is to provide an optical switch that overcomes the limitations of the above noted prior art. Another object of the invention is to provide an optical switching unit which is relatively low in cost, has high speed and is reliable in operation.

Briefly stated, an improved optical transmission switch made in accordance with the invention employs a microelectromechanical (hereinafter MEM) movable mirror assembly with associated electromagnet coils mounted in a package and preferably including control LED's with both drive and LED signals being supplied through a wiring harness. The following described preferred embodiments relate to a hermetic package using inorganic materials in order to provide extended life, however, units can be made which include organic materials for other shorter life applications.

The package comprises an LED lead frame of suitable material such as ceramic, which mounts LED's used by the control system to aim the movable mirror as well as circuitry to electrically connect the LED's to their package terminations. The LED's are die and wire bonded to the lead frame using conventional techniques. The LED's are located so that lines drawn through diagonal pairs would pass through a selected location on the lead frame which is referenced the movable mirror. A mirror assembly, described below, is attached to the lead frame so that the center of the mirror portion coincides with the selected location on the lead frame in order to accurately locate the mirror for proper control of mirror movement. The mirror assembly and lead frame are mounted in a header of suitable material, such as ceramic which, along with driving means and a wiring harness, are in turn mounted on a bracket. The package is received in a housing in which an optical fiber is received and in which another mirror is disposed in alignment with the fiber for reflecting an optical signal from the fiber to the movable mirror.

MEM micromirrors are presently used to build digital micromirror display (DMD) devices where the mirrors rotate about a single axis by an electrostatic drive. The mirror of the present invention provides two axes of motion and is preferably driven magnetically. The micromirror is preferably made from a single piece of crystal material such as silicon and has three portions connected by two sets of hinges. An inner portion forms the mirror. One of the hinge pairs, one hinge on each of two opposite sides of the mirror portion, ties the mirror portion and the middle gimbals portion, which surrounds the mirror portion. This allows the mirror portion to rotate about the gimbals portion, providing the first axis of rotation. The second set of hinges ties the gimbals portion and the frame portion, one hinge on each of two opposite sides on a line disposed, preferably 90 degrees relative to a line drawn through the first set of hinges. This allows the gimbals portion, which carries the mirror, to rotate about the frame portion, providing a second axis of rotation.

In the first preferred embodiment, two pair of magnets, one for each axis of rotation, are used to move the mirror portion and are mounted on one face of the single piece to form a mirror assembly. The first pair of magnets are attached by suitable means to the mirror portion of the mirror assembly, one on each of two opposite sides of a line, 90 degrees relative to a line through the mirror/gimbals portions set of hinges. When magnetically stimulated, the mirror portion rotates about the mirror/gimbals portions set of hinges, providing the first axis of motion. The second pair of magnets are suitably attached to the gimbals portion of the mirror assembly, one on each of two opposite sides of a line, 90 degrees relative to a line drawn through the gimbals/frame portions set of hinges. When magnetically stimulated, the mirror and gimbals portions rotate about the second set of axis, to providing the second axis of rotation.

According to a feature of the invention, an additional magnet is provided at each magnet location, with the poles in opposing relationship to each other and disposed on the opposite face of mirror assembly to balance the weight of the magnets relative to the hinge centerlines of the mirror assembly, minimizing undesirable oscillations under external shock or other conditions.

According to a modified embodiment, a single magnet can be utilized located in the center of the mirror portion, on the face opposing the surface serving as the mirror.

According to another feature of the invention, motion stops, disposed in a plane described by the two axes of rotation, are added to the mirror assembly at each hinge location to limit motion and thereby prevent failure of the hinge. Tabs are preferably formed in the plane described by the two axes of rotation, extending from the mirror portion to the gimbals portion and from the gimbals portion to the frame portion, to prevent rotation during initial manufacture. Sometime prior to final assembly, laser or other suitable cutting means severs the tabs, preferably perpendicular to each respective axis of the hinges, to allow free rotation.

In order to obtain extended operation without degradation, the mirror assembly is preferably hermetically assembled into a cavity in the package to lock out moisture and allow the provision of a benign atmosphere for micromirror operation. The cavity can be filled with selected gases to provide improved heat transfer and, if desired, exclude oxygen water vapor and other materials that would adversely affect the micromirror over time. The hermetic package comprises the header in which the cavity is formed and which includes sealed pins for electrical LED connection pins. A peripheral seal surface on the header extending around the cavity is coated with indium or suitable non-organic seal materials, for later attachment of a window over the cavity. The use of indium allows the seal to be made at room temperature to avoid seal temperature induced stresses and window distortions. Indium or other non-organic attach materials are used exclusively to assembly all items within the body cavity of the hermetic package, avoiding any unwanted long term organic out gassing or other similar problems.

According to another feature, the window is tilted at a slight angle, such as 6 degrees, to deflect unwanted stray radiation away from the desired optical path.

The lead frame assembly described above, containing LED's and the mirror assembly, is placed in and attached to the body on a platform within the cavity. The tabs preventing rotation of the mirror and gimbals portions during assembly may now be released as described above. The body cavity is sealed with a glass window that preferably has been treated with anti-reflective coatings.

An air coil drive assembly is used and preferably employs a push and pull arrangement for driving the mirror magnets to rotate the mirror portion to the desired orientation in its two axes. Four air coil assemblies, comprising copper wire coiled on a bobbin, are attached to a mounting bracket, trapping a flex circuit harness and are aligned with the mirror assembly. The air coil leads are soldered to the flex circuit harness to allow system electrical control of the air coils and their push pull arrangement to drive the mirror assembly. The air coil bobbins are made of aluminum or other eddy current generating material, and sufficient amounts of aluminum are provided at the top and bottom of the bobbins to allow eddy current dampening of the movable portions of the mirror assembly, to prevent unwanted oscillations. In order to prevent overheating and loss of mirror position control, the air coil bobbins are made of high heat transfer material, such as aluminum, and the bobbins are massive relative to the air coils. The mounting bracket is massive relative to the bobbins and is also made of a high heat transfer material, such as aluminum. The bracket is in intimate contact with the optical unit housing, which in turn is in intimate contact with the ultimate heat sinking of the customer's system.

According to yet another feature, the air coil bobbins trap the flex circuit harness to the bracket when the air coil bobbins are attached to the bracket to facilitate later location and assembly of the flex circuit to the bracket. The LED pins of the header assembly are soldered to the appropriate pads on the flex circuit harness. The micromirror can fully be tested at this point. The header assembly is then rotated and aligned with the mounting bracket and joined by fixing the header assembly to the mounting bracket. The open area around the air coils is then potted with heat conductive material to ensure optimum assembly rigidity and improved heat transfer.

Other objects and advantages of the present invention will be apparent from the following description.

BRIEF DESCRIPTION OF THE DRAWINGS

For a more complete understanding of the present invention and further advantages thereof, reference is now made to the following detailed description of the preferred embodiments taken in conjunction with the drawings in which.

DETAILED DESCRIPTION OF PREFERRED EMBODIMENTS

Figure 1:
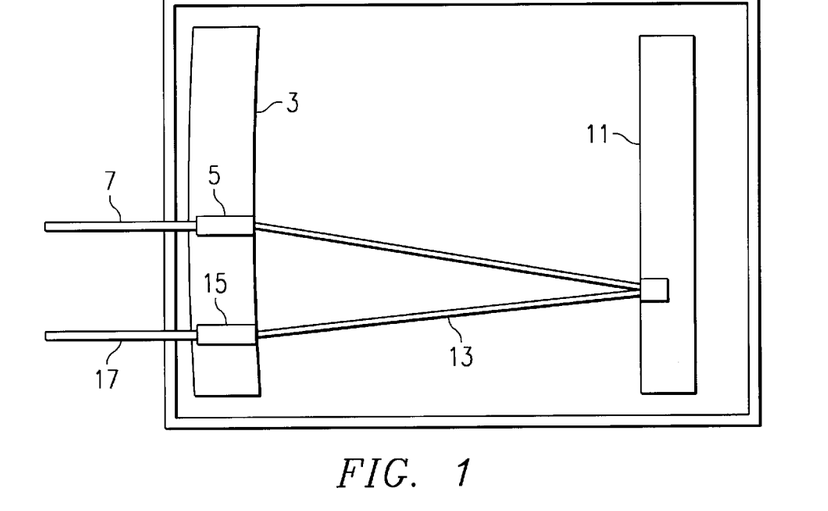
FIG. 1 is a schematic view of an optical switching station showing two optical switching units.

FIG. 1 shows the layout of a matrix optical switch station comprising a plurality of parallelly extending optical switch units 5 and 15, two being shown for purposes of illustration, but any number can be provided as desired. These switch units are mounted in a frame 3 such that they are aligned with optical switch mirror 11 fixedly mounted in housing 1. An end portion of fiber optics cable 17 is mounted in a selected fixed position within housing 1 and fiber optics cable 7 is similarly affixed into the housing of optical switch 5. An optical signal 13 is transmitted in cable 17 and is directed by optical switch unit 15, by reflecting optical signal 13 from optical switch mirror 11 to another selected optical switch unit, such as optical switch 5, which directs optical signal 13 into cable 7.

Figure 2:
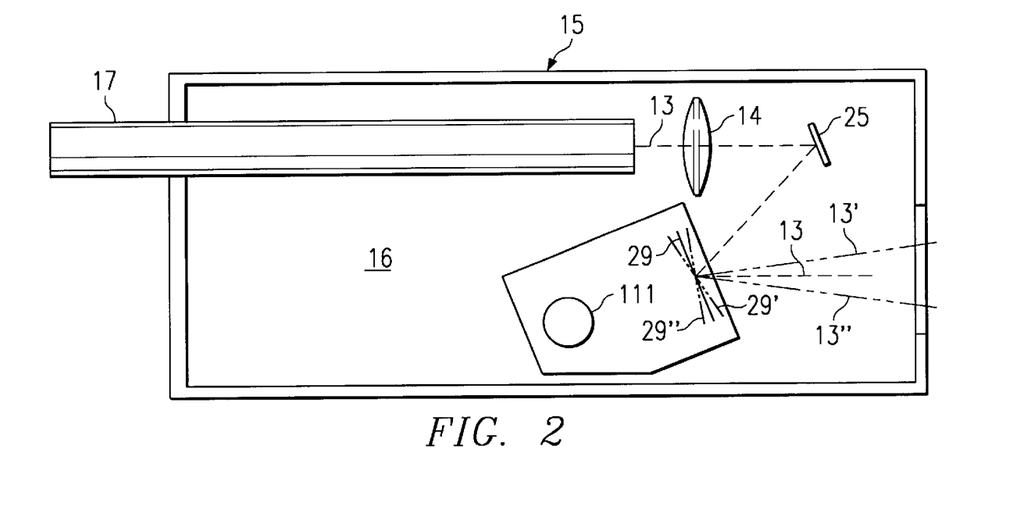
FIG. 2 is a schematic view of one of the optical switching units shown in FIG. 1.

The optical signal is optimized to minimize transmission losses by the optical units. As seen in FIG. 2, optical beam 13 carried by optical cable 17 is focused by lens 14 and is reflected by a fixed mirror 25 mounted within optical switch 15 to a moveable mirror 29, shown in a solid line in its middle or neutral unpowered position. Mirror 29 is moveable between two opposite extremes, 29', 29", with optical beam 13 correspondingly reflected to 13', 13", respectively. Although the movement of the mirror shown in FIG. 2 illustrates movement in one plane, mirror movement in a second plane is also included in the operation of the switch and will be described below.

Figure 3:
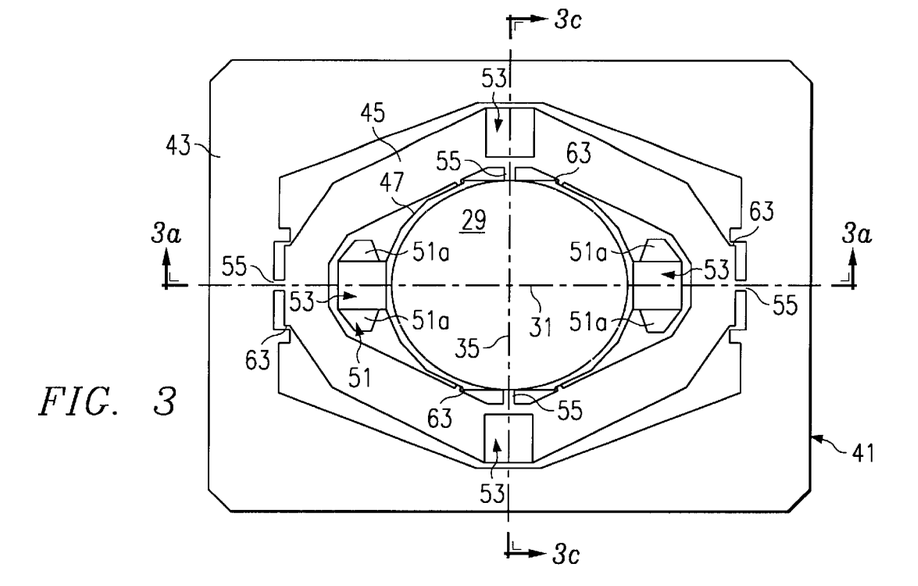
FIG. 3 is a plan view of a mirror assembly used in the FIG. 2 switch unit.

Mirror assembly 41, FIG. 3, includes a frame portion, an intermediate gimbals portion and an inner mirror portion preferably formed from one piece of crystal material such as silicon. The silicon is etched to provide outer frame portion 43 forming an opening in which intermediate annular gimbals portion 45 is attached at opposing hinge locations 55 along first axis 31. Inner, centrally disposed mirror portion 47, having a mirror 29 centrally located thereon, is attached to gimbals portion 45 at hinge portions 55 on a second axis 35, 90 degrees from the first axis. Mirror 29, which is on the order of 100 microns in thickness, is suitably polished on its upper surface to provide a specular surface. In order to provide necessary flatness, the mirror is formed with a radius of curvature greater than approximately 2 meters, with increasing optical path lengths requiring increasing radius of curvature. The radius of curvature can be controlled by known stress control techniques such as, by polishing on both opposite faces and deposition techniques for stress controlled thin films. If desired, a coating of suitable material can be placed on the mirror portion to enhance its reflectivity for specific radiation wavelengths.

Mirror assembly 41 also comprises a first pair of permanent magnets 53 mounted on gimbals portion 45 along the second axis and a second pair of permanent magnets 53 is mounted on extensions 51, which extend outwardly from mirror portion 47 along the first axis. In order to symmetrically distribute mass about the two axes of rotation to thereby minimize oscillation under shock and vibration, each permanent magnet 53 preferably comprises a set of an upper magnet 53a mounted on the top surface of the mirror assembly 41 using conventional attachment techniques such as indium bonding, and an aligned lower magnet 53b similarly attached to the lower surface of the mirror assembly as shown in FIGS. 3a–3d. The magnets of each set are arranged serially such as the north/south pole arrangement indicated in FIG. 3c. There are several possible arrangements of the four sets of magnets which may be used, such as all like poles up, or two sets of like poles up, two sets of like poles down; or three sets of like poles up, one set of like pole down, depending upon magnetic characteristics desired.

By mounting gimbals portion 45 to frame portion 43 by means of hinges 55, motion of the gimbals portion 45 about the first axis 31 is provided and by mounting mirror portion 47 to gimbals portion 45 via hinges 55, motion of the mirror portion relative to the gimbals portion is obtained about the second axis 35, thereby allowing independent, selected movement of the mirror portion 47 along two different axes.

Figure 3A:
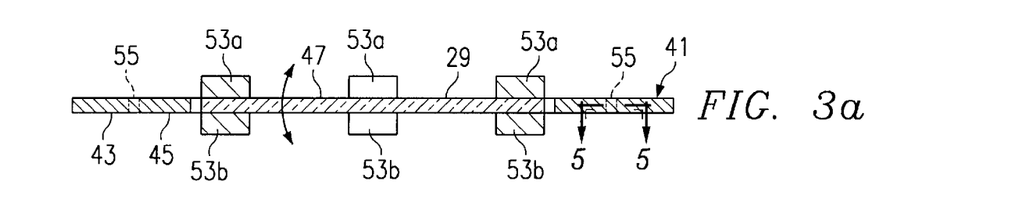
FIG. 3a is a cross sectional view taken on line A—A of FIG. 3.
Figure 3B:
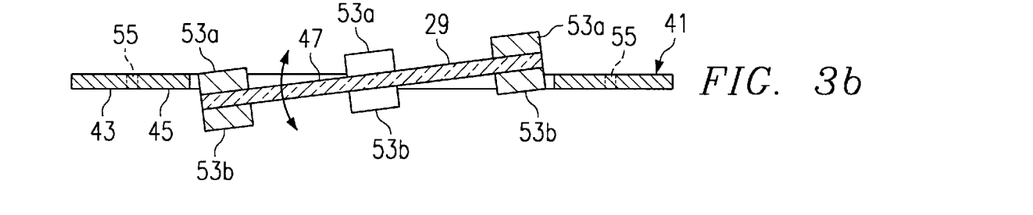
FIG. 3b is a view similar to FIG. 3a but showing rotation of the mirror portion of the mirror assembly.
Figure 3C:
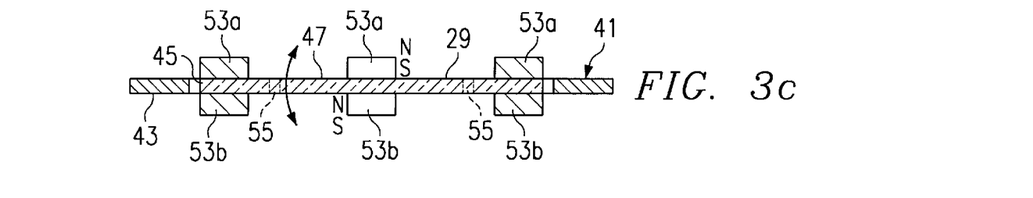
FIG. 3c is a cross sectional view taken on line B—B of FIG. 1.
Figure 3D:
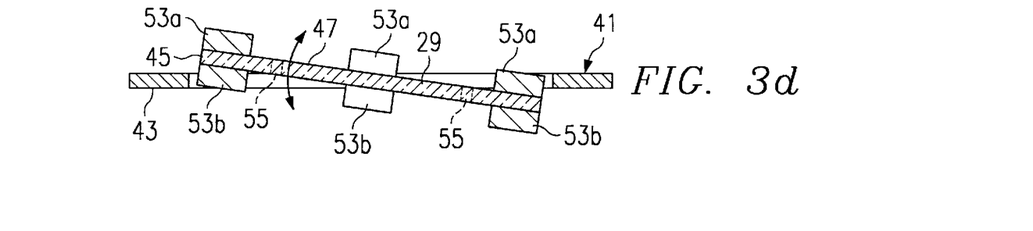
FIG. 3d is a view similar to FIG. 3c but showing rotations of the gimbals portion of the mirror assembly.

The middle or neutral position of mirror assembly 41 is shown in FIG. 3a, which is a section taken through the assembly along line A—A of FIG. 3. Rotation of mirror portion 47 about axis 35 independent of gimbals portion 45 and/or frame portion 43 is shown in FIG. 3b as indicated by the arrow. FIG. 3c shows the middle position of the mirror assembly 41, similar to that shown in FIG. 3a, but taken along line B—B of FIG. 3. Rotation of the gimbals portion 45 and mirror portion 47 about axis 31 independent of frame portion 43 is shown in FIG. 3d as indicated by the arrow. The above independent rotation of mirror 29 of mirror portion 47 about the two axes allows direction of optical beam 13 as needed by the optical switch units.

Figure 4:
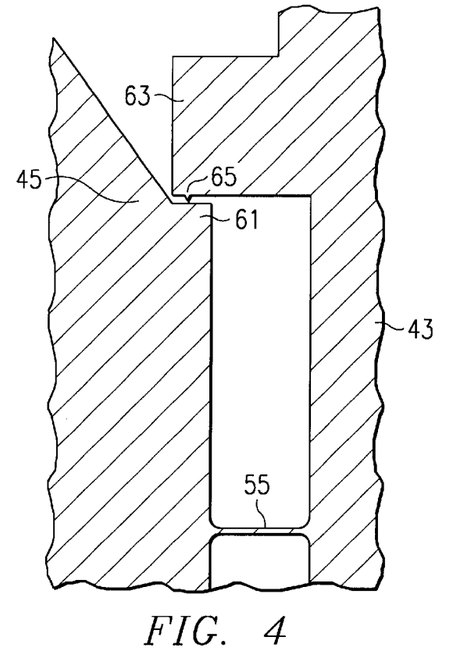
FIG. 4 is an enlarged cross sectional plan view taken on line E—E of 3a showing a hinge and an in-plane motion stop.
Figures 5, 6A:
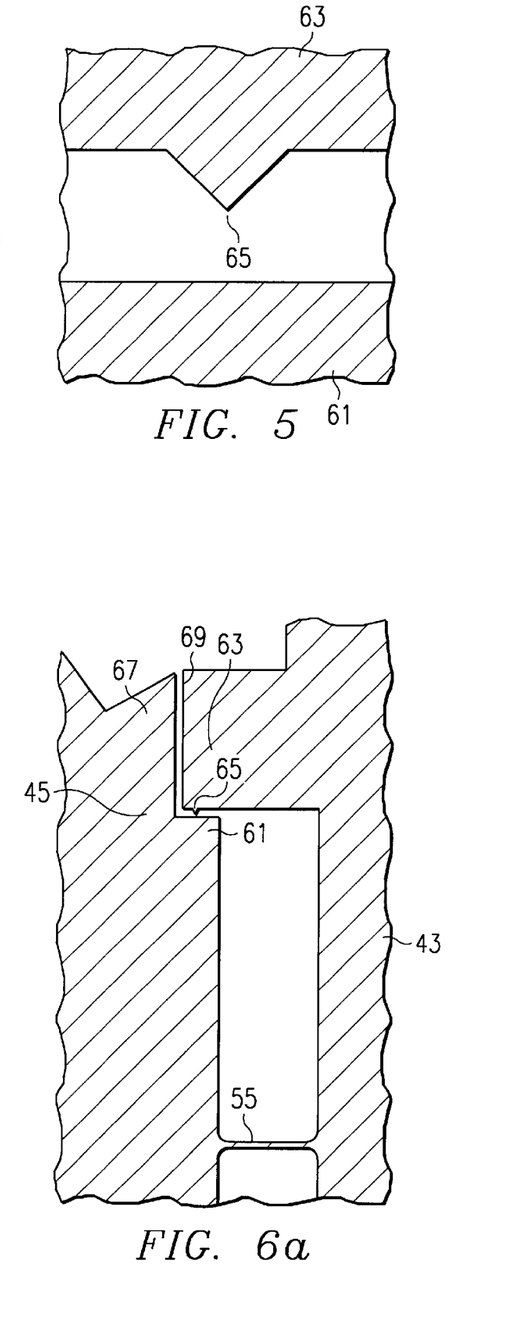
FIG. 5 is an enlarged, broken away portion of FIG. 4 showing a portion of the in-plane stop.
FIG. 6a is a view similar to FIG. 6 showing the lock down tab severed to allow rotation.

In order to protect hinges 55 from in-plane shock during handling and shipping, stops are provided according to an optional feature of the invention as best shown in FIGS. 4 and 5, which are enlarged sectional views taken on line E—E of FIG. 3a. At this point it should be noted that the mirror assembly is on the order of 100 microns thick, whereas hinge 55 of the same thickness is on the order of 10 microns wide, thereby providing robust strength in directions normal to the surface of the assembly. In order to provide protection against excess in-plane motion 90 degrees to the axis of the hinge, for example, axis 31, cooperating surfaces 61 on gimbals portion 45 and 63 on frame portion 43 are formed on either side of each hinge 55 and extend generally parallel to axis 31. Surfaces 61 and 63 are spaced apart a selected distance such as 10 microns by way of example. In order to provide less in-plane motion, projection 65, extending from surface 63 towards surface 61, is formed to any selected distance such as 5 microns. It will be understood that such projection could be provided on surface 61 instead of 63 if desired. Similar stops are provided on the mirror and gimbals portions to provide protection against in-plane motion of hinges 55 relative to axis 35.

Figure 6:
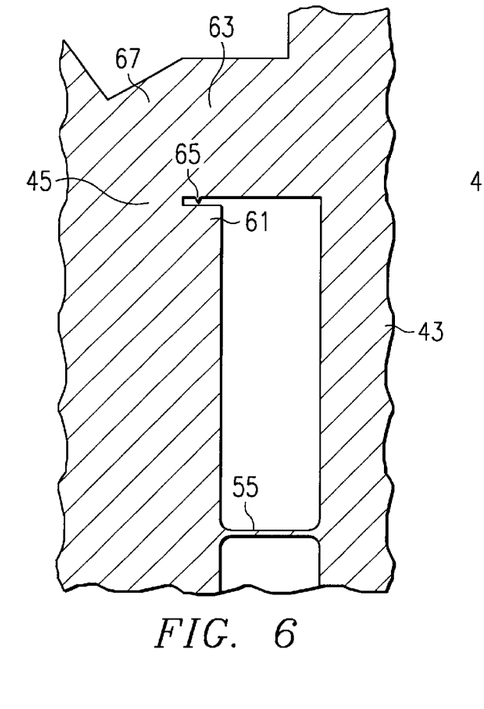
FIG. 6 is a cross sectional plan view taken on line E—E of FIG. 3a, showing a hinge with an optional lock down tab to stop rotation used during manufacture.

According to another optional feature of the invention, lock down tabs associated with each hinge are provided. As seen in FIG. 6, an example showing one such hinge 55, bridge portion 67 extends from gimbals portion 45 to frame portion 43 and locks the two portions together isolating hinge 55 from all normal manufacturing stresses. At the appropriate manufacturing step, the bridge portion 67 is cut providing gap 69 as shown in FIG. 6a, which allows normal rotation of gimbals portion 45 relative to frame portion 43 about the hinge 55. This provides suitable stress protection for all hinges and significantly improves manufacturing yields.

With reference to FIG. 3, extensions 51 are preferably provided with laterally extending tabs 51a which can be used to clamp down the mirror portion during assembly to thereby provide additional stress protection.

Figure 7:
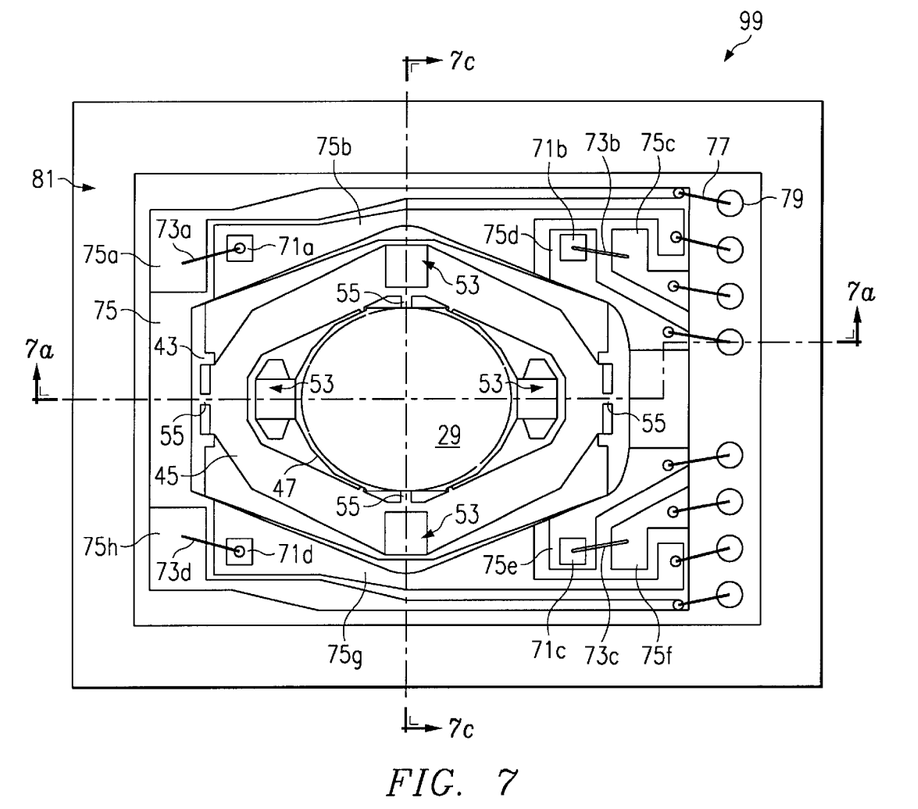
FIG. 7 is a top plan view of an optical switch package made in accordance with the invention.
Figure 7A:
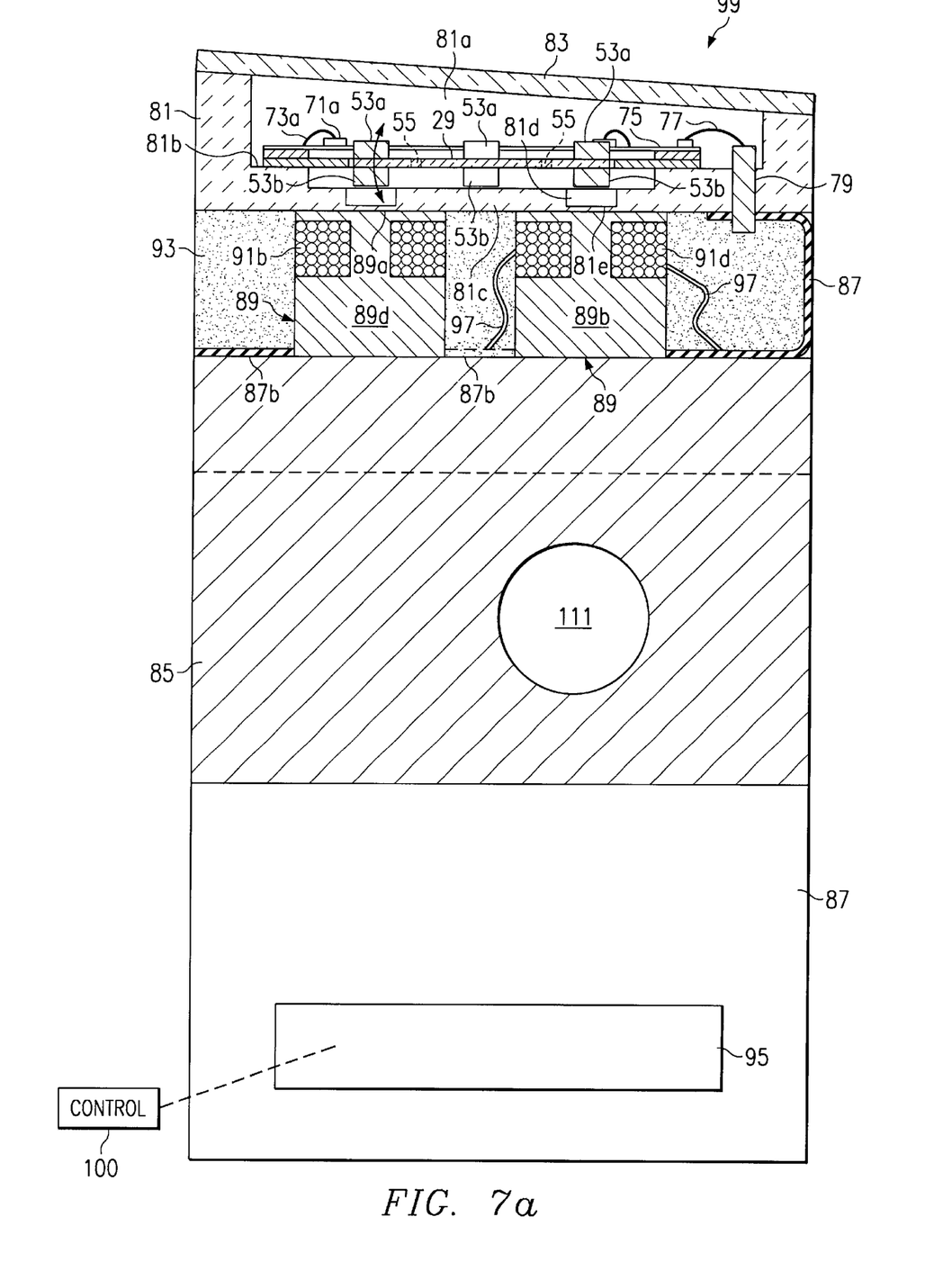
FIG. 7a is a cross sectional view taken on line C—C of FIG. 7.
Figure 7B:
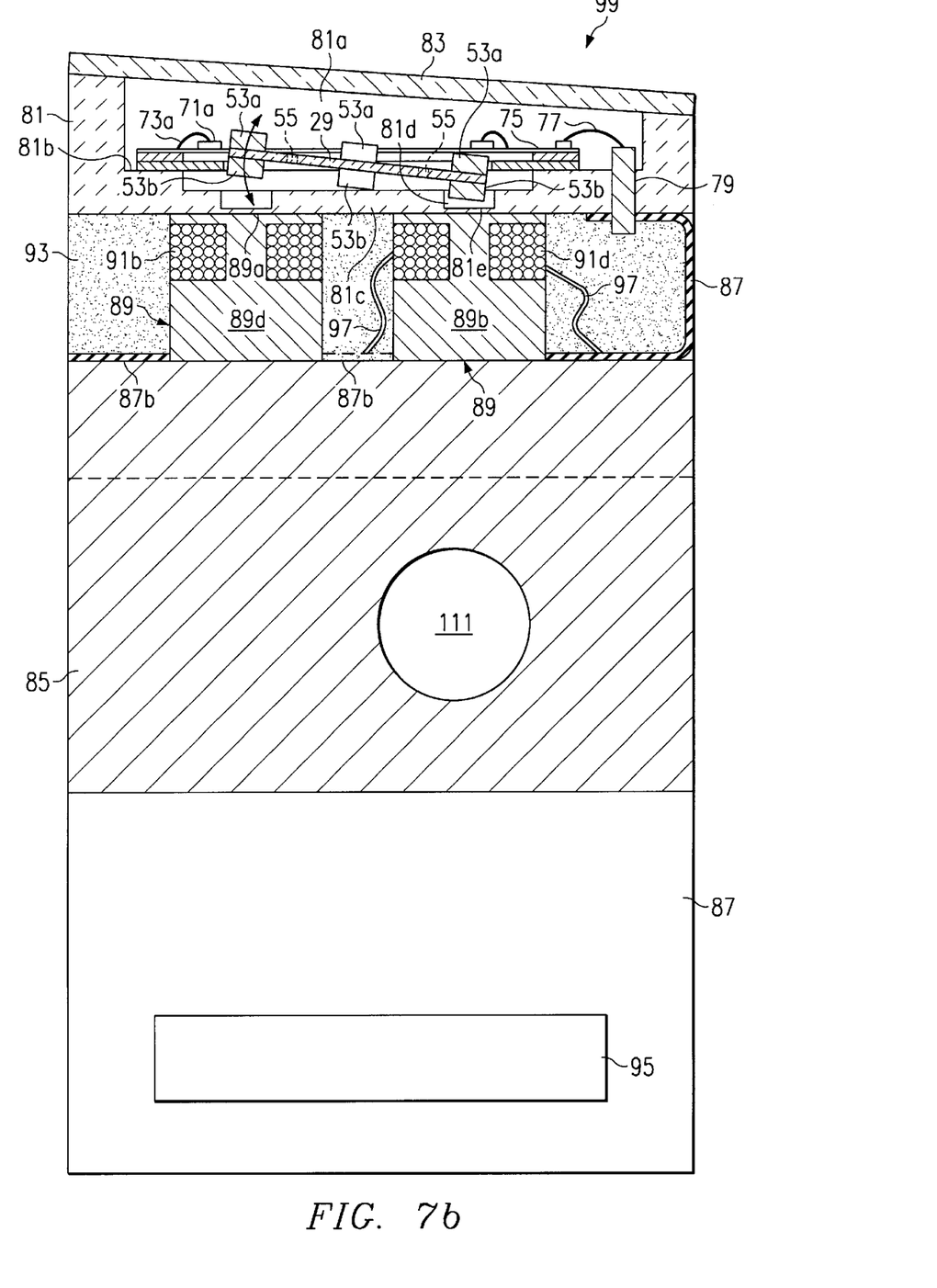
FIG. 7b is a view similar to FIG. 7 showing rotation of the mirror portion of the mirror assembly.
Figure 7C:
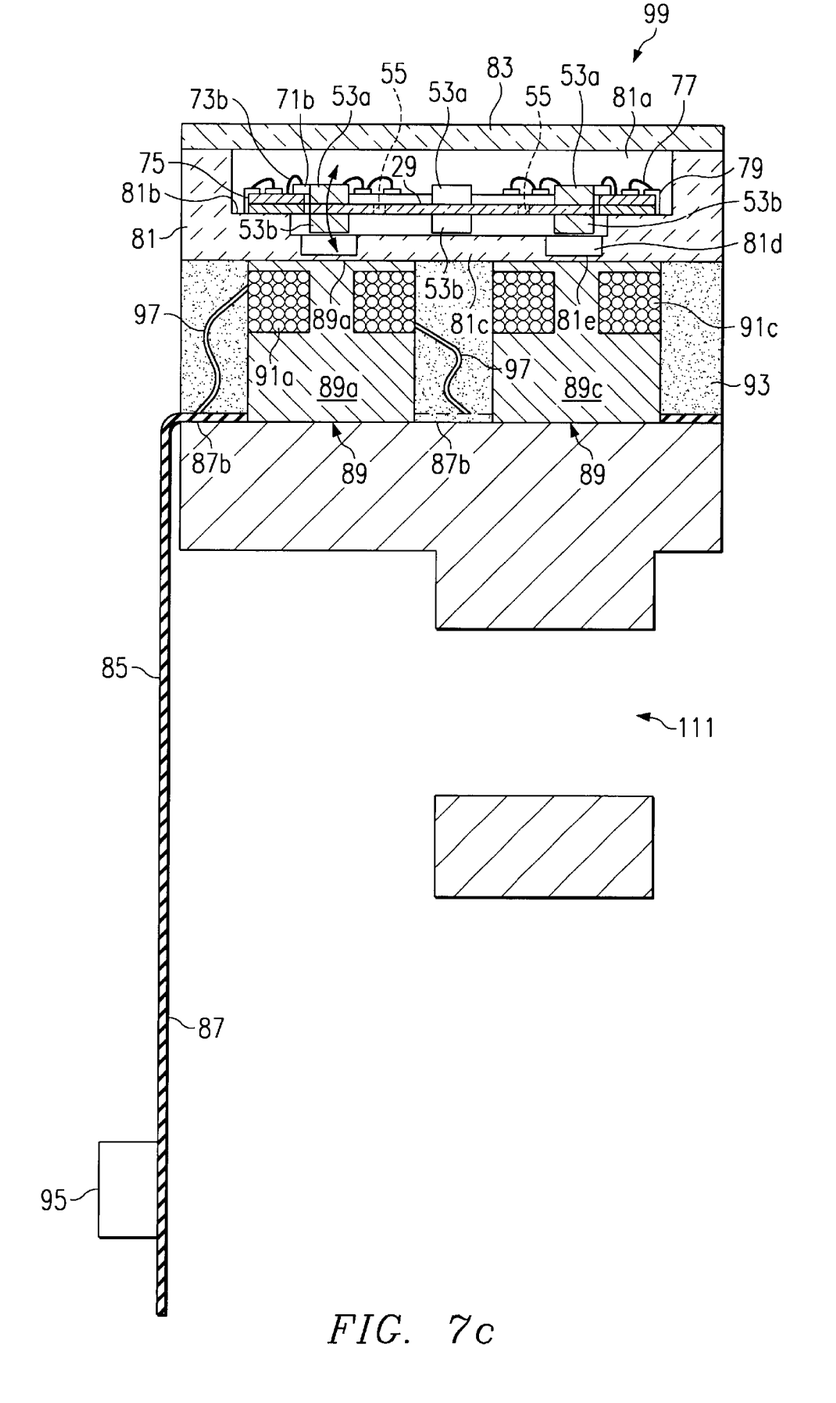
FIG. 7c is a cross sectional view taken on line D—D of FIG. 7.
Figure 7D:
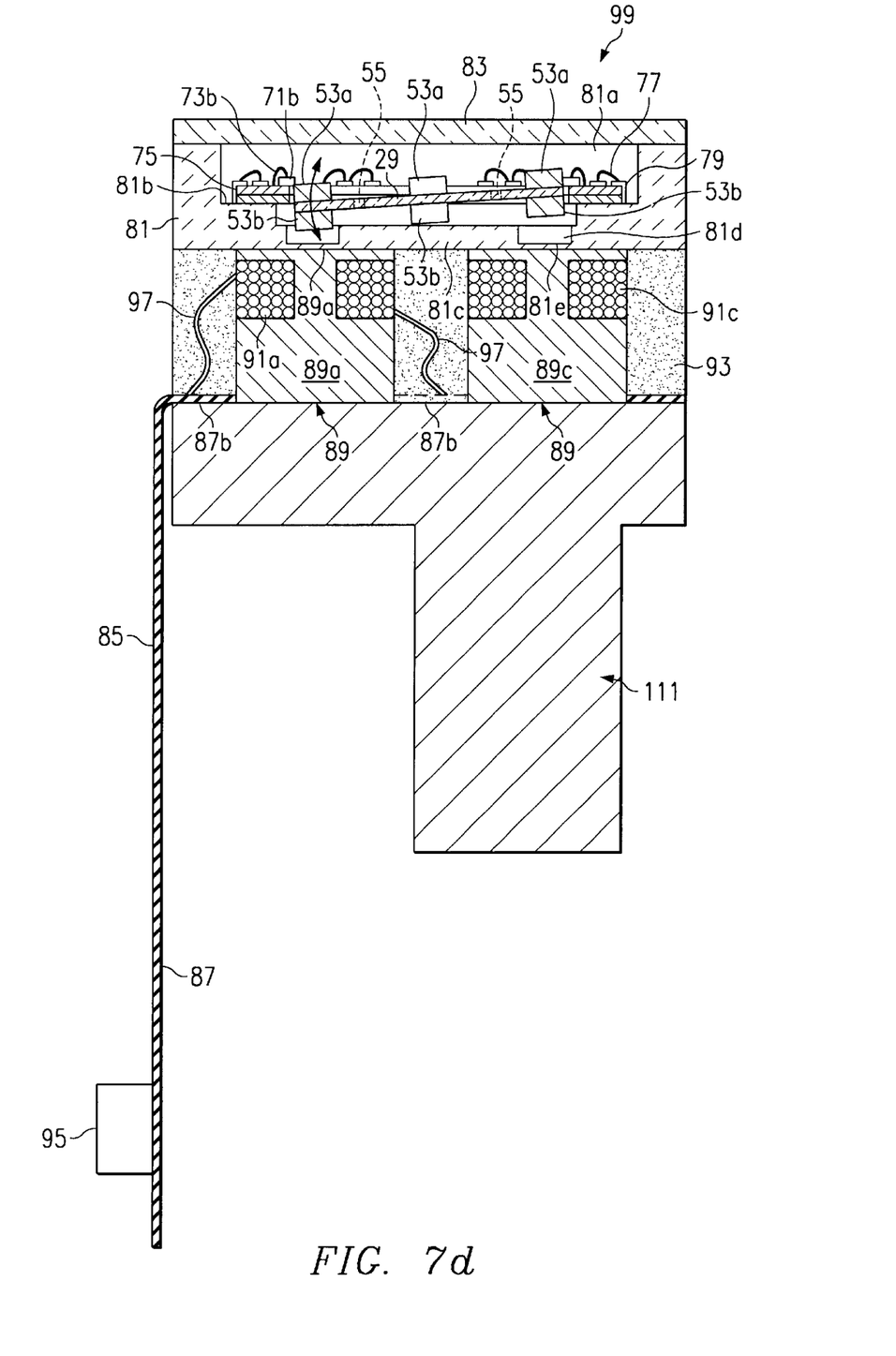
FIG. 7d is a view similar to FIG. 7c but showing rotation of the gimbals portion of the mirror assembly.

The movable mirror assembly 41 is received in a cavity 81a of a header 81 which forms part of the mirror assembly package shown in FIGS. 7–7d. Header 81 is formed of any suitable material, such as ceramic in the case of a hermetic package and plastic where hermeticity is not required, and has a circumferentially extending shelf 81b formed within cavity 81a on which frame portion 43 of mirror assembly 41 is received. Bottom wall 81c is spaced from shelf 81b to provide clearance for movement of gimbals portion 45 and mirror portion 47. Recesses 81d are formed in bottom wall 81c aligned with each set of magnets 53 to provide motion clearance for lower magnets 53b. The size of the opening of recesses 81d is maintained as small as possible, allowing suitable motion of the magnets, to facilitate making wall 81e as thin as practicable, for example 125 microns.

The magnet drive for the magnets comprise four air coils 91a–d (shown in FIGS. 7a–7d) each wound on a bobbin in turn mounted on mounting bracket 85 and aligned with respective recesses 81d and magnets 53. The bobbin and bracket are made of suitable material for good heat transfer, magnetic dampening, and strength such as aluminum. The air coils are wound using high electrical conductivity materials such as copper. The bobbin has an air coil disposed proximate to top end 89a of bobbin 89 such that the air coil is as close to magnets 53 as possible, for example, 200 microns, to provide full mirror rotation using minimum power.

An electrical wiring harness 87 is provided for required electrical connections to the micromirror assembly package 99 and comprises an elongated flex circuit 87 mounting a connector 95 at one end thereof for connection to a control system (indicated at 100, FIG. 7a). An opening 87b is formed at an opposite end which receives therein bobbins 89. Coil leads 97 are attached to appropriate traces on the flex circuit as shown in 7c–7d. A plurality of diode pins 79 are mounted in bores provided in shelf 81b and extend above and below the shelf. The upper portion of the diode pins are connected by leads 77 to respective conductive pads 75a–75h (see FIG. 7) and on the lower end are connected to respective traces on electrical harness 87. LED's 71a–71d are assembled to board 75 in according to conventional semiconductor techniques and are powered by the traces on the harness discussed above. The LED's 71a–71d are positioned so that they can be used to direct the optical beam 13 using the optic unit's sensing control system 100.

Once the electrical connections are made to the diode pins 79, window 83 is attached to the open side of header 81, closing cavity 81a. The closing of cavity 81a can be made to be a hermetic seal by using known techniques such as employing indium as the window seal material and glass sealing or the like sealing of the diode pins 79 to the header 81. If desired, a protective atmosphere such as nitrogen can be trapped within the cavity. The window is of suitable material and anti-reflective coatings to allow transmission of optical signal 13 with minimum losses and is preferably tilted approximately 6 degrees relative to the plane in which mirror assembly lies, to deflect unwanted stray radiation. In this respect, the spacing between gimbals portion 45 and mirror portion 47 is maintained sufficiently large to avoid unwanted stray radiation.

After the electrical connections are made between diode pins 79 and harness 87 completing all electrical connections, header 81 with all of its internal components described above, are aligned with mounting bracket 85 and its components and potted in place with thermally conductive, strong potting material 93 to complete the micromirror assembly package 99.

Figure 8:
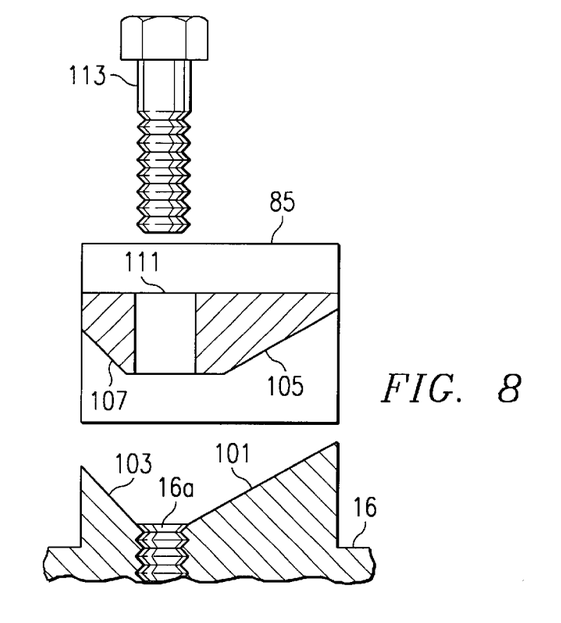
FIG. 8 is an exploded view of a cross sectional, broken away portion of the bottom wall of the housing of an optical switching unit package and the mounting bracket.

With particular reference to FIG. 8, micromirror assembly package 99 is precisely mounted and orientated in optical switch unit 15 utilizing cooperating registration surfaces of mounting bracket 85 and a portion of wall 16 of switch unit 15. First opposing inclined surfaces 107 and 105 forming a somewhat convex configuration on mounting bracket 85 cooperate with respective second opposing inclined surfaces 103 and 101, forming a somewhat concave, or cradle configuration, respectively, on bottom wall 16 of the switch unit. Mounting bolt 113 is received through bore 111 in bracket 85 and threaded bore 16a in the cradle in bottom wall 16 to secure micromirror assembly package 99 within optical switch unit 15. The cooperating opposed surfaces provide a precise registration in two planes while bolt 113 and its corresponding bore 111 in bracket 85 and threaded bore 16a in wall 16 provides registration in a third plane. It will be realized that the convex and concave configurations can be reversed if desired and further, that the surfaces can be fixed to one another by means other than a bolt, for example, by welding.

Figure 9:
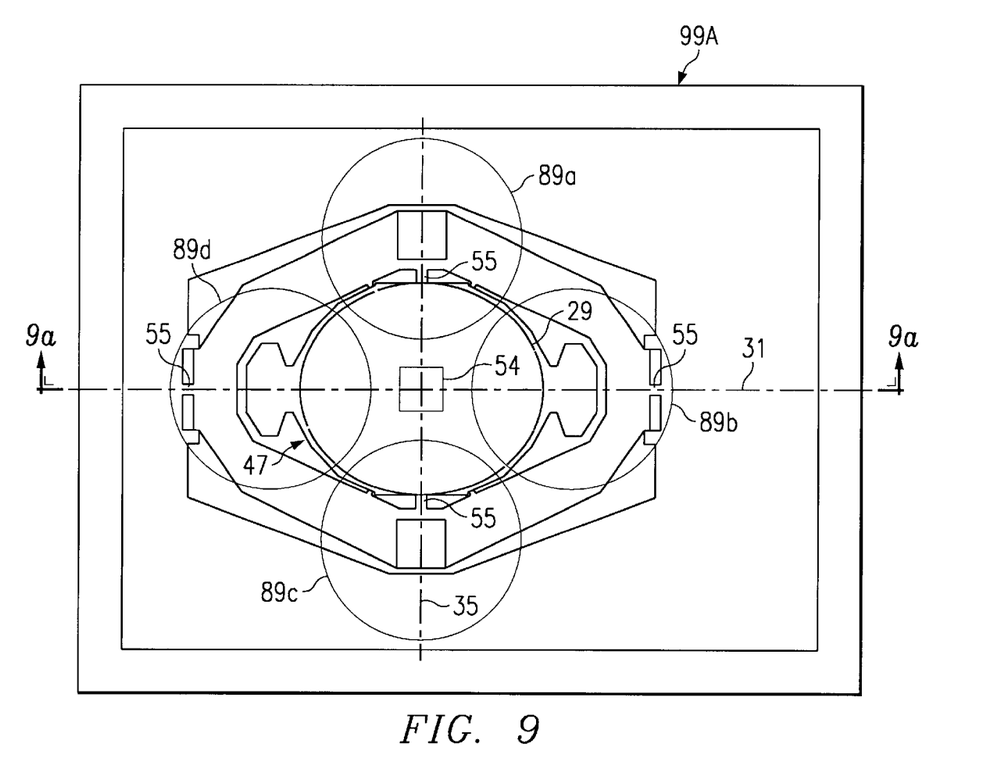
FIG. 9 is a top plan view of a modified embodiment of an optical switch unit with certain parts removed for purposes of illustration.
Figure 9A:
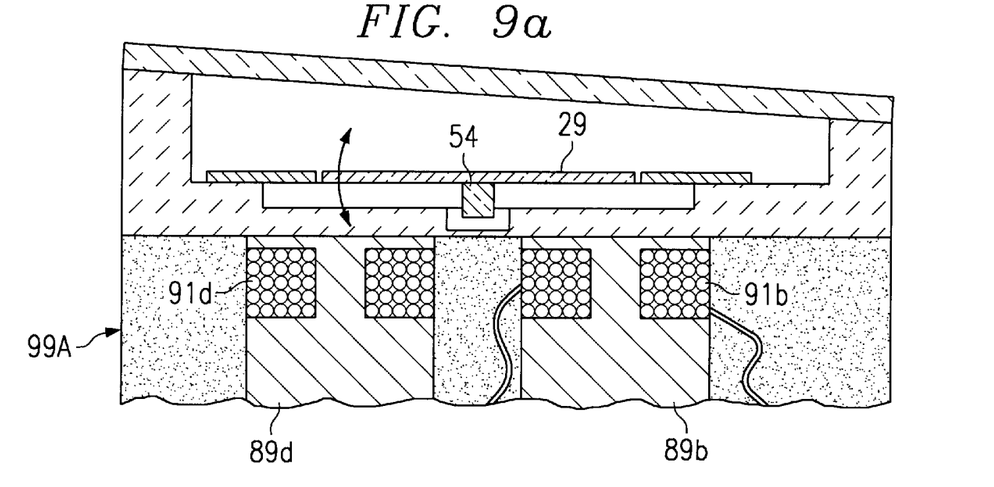
FIG. 9a is a cross sectional view of the top portion of an optical switch unit taken on line F—F of FIG. 9.
Figure 9B:
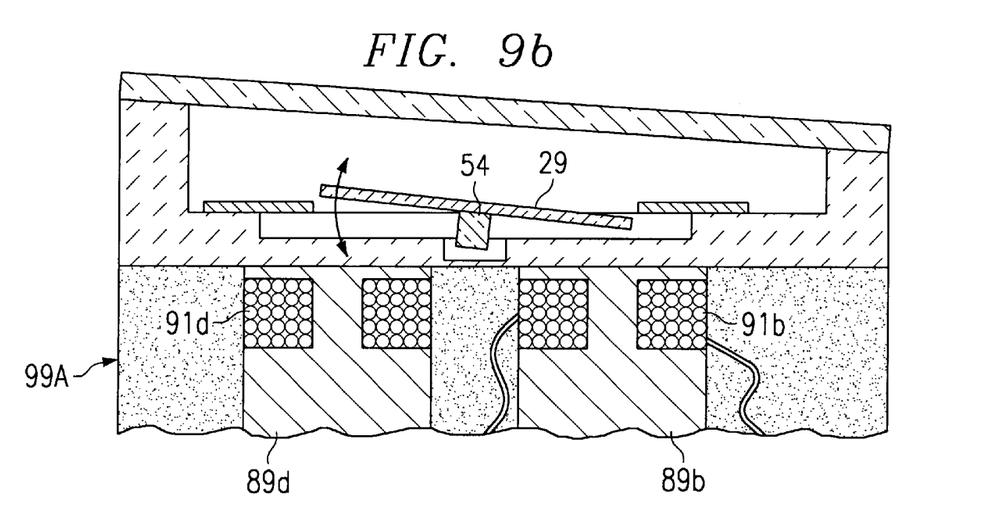
FIG. 9b is a view similar to FIG. 9a but showing rotation of the mirror portion of the modified mirror assembly.

An alternate embodiment is shown in FIG. 9 in which a single permanent magnet 54 is centrally located on the lower side of the mirror portion 47. Air coils 89a–89d are shown located in the same positions as in the FIGS. 3–7 embodiment and can be independently excited so that the interaction of the magnetic field of the permanent magnet and the coils cooperate to produce the appropriate magnetic field to cause movement of the mirror portion along each axis 31 and 35, as desired. Although four air coils are shown, if desired, three air coils could be used to produce the desired magnetic field.

A micromirror assembly package made in accordance with the invention included a mirror portion which measured approximately 3 mm×4 mm in width and length and had approximately 8 degrees of rotation about each of axes 31 and 35.

Although the invention has been described with regards to specific preferred embodiments thereof, variations and modifications will become apparent to those skilled in the art. For example, magnet and air coil locations other than those described above can be employed as long as appropriate currents can be applied by means of control 100 to the air coils to move the gimbaled mirror to a desired orientation. In this respect, with reference to the four coil arrangement shown, a push-pull drive in control 100 is preferred. Further, although permanent magnets are shown attached to the movable mirror assembly, it will be appreciated that, if desired, magnetic material could be added to the assembly instead of the permanent magnets and polarized perpendicular to the mirror surface. It is therefore the intention that the appended claims be interpreted as broadly as possible in view of the prior art to include all such variations and modifications.

What is claimed:

1. Optical switching apparatus comprising,
   a header having a bottom wall and upwardly extending side walls forming a recess, a platform formed along the side walls spaced above the bottom wall,
   a micromirror formed from a single piece of material having an outer frame portion lying in a plane and supported on the platform, an intermediate rotational gimbals portion hinged to the frame portion and movable relative to the frame portion about a first axis and an inner rotational mirror portion having a reflective, upper face surface formed with a radius of curvature of at least 2 meters hinged to the gimbals portion for movement of the mirror portion relative to the gimbals portion about a second axis, at least one magnet attached to one of the rotational portions, and
   at least one electromagnetic coil assembly disposed in close proximity to the mirror assembly for applying selected forces to the at least one magnet for causing desired movement of the gimbals portion and the mirror portion along the two axes to reflect an optical beam directed to the mirror portion in a selected direction.

2. Optical switching apparatus according to claim 1 in which the gimbals portion is hinged to the frame portion by a pair of hinges spaced apart along the first axis and the mirror portion is hinged to the gimbals portion by a pair of hinges spaced apart along the second axis.

3. Optical switching apparatus according to claim 1 in which the axes are disposed 90 degrees relative to one another.

4. Optical switching apparatus according to claim 1 further comprising a pair of magnets for driving movement of the gimbals portion disposed on spaced apart locations of the gimbals portion along the second axis and a pair of magnets for driving movement of the mirror portion disposed on spaced apart locations of the mirror portion along the first axis.

5. Optical switching apparatus according to claim 4 in which each magnet comprises a set of an upper magnet attached to an upper face surface of the respective gimbals portion and mirror portion and a lower magnet attached to a lower surface of the respective gimbals portion and mirror portion, the respective upper and lower magnets of a set being in alignment with each other.

6. Optical switching apparatus according to claim 4 further comprising a push-pull drive for exciting the magnets.

7. Optical switching apparatus according to claim 1 in which the at least one electromagnetic coil assembly is disposed in engagement with the bottom wall of the header, a respective coil assembly being in alignment with a location of each magnet.

8. Optical switching apparatus according to claim 1 further comprising a single magnet mounted on a lower face surface of the mirror portion.

9. Optical switching apparatus according to claim 1 in which the piece is formed of silicon.

10. Optical switching apparatus according to claim 9 in which the mirror portion has a lower face surface and both the upper and lower face surfaces are polished thereby providing improved surface flatness.

11. Optical switching apparatus according to claim 1 in which the header is ceramic and a glass window is attached to the header covering the recess, the glass window being attached with indium forming a hermetic seal with a selected atmosphere sealed in the recess.

12. Optical switching apparatus comprising:
a header having a bottom wall and upwardly extending side walls forming a recess, a platform formed along the side walls spaced above the bottom wall;
a micromirror formed from a single piece of material having an outer frame portion living in a plane and supported on the platform, an intermediate rotational gimbals portion hinged to the frame portion and moveable relative to the frame portion about a first axis and an inner rotational mirror portion having a reflective upper face surface hinged to the gimbals portion for movement of the mirror portion relative to the gimbals portion about a second axis, at least one magnet attached to one of the rotational portions;
at least one electromagnetic coil assembly disposed in close proximity to the mirror assembly for applying selected forces to the at least one magnet for causing desired movement of the gimbals portion and the mirror portion along the two axes to reflect an optical beam directed to the mirror portion in a selected direction, the at least one electromagnetic coil assembly disposed in engagement with the bottom wall of the header, a respective coil assembly being in alignment with each spaced apart magnet location, in which each coil assembly comprises a bobbin having a spool on which a coil is wound and an aluminum plate portion between the respective coil and the bottom wall of the header, the bobbins having a massive heat sink portion of heat conductive material relative to the respective coils on a side of the coils remote from the plate portion.

13. Optical switching apparatus according to claim 12 further comprising a flex circuit electrically connected to the coils and a mounting bracket formed of heat conductive material, the flex circuit received on the mounting bracket, the mounting bracket being relatively massive relative to the coil assemblies, the header mounted on the mounting bracket with the coil assemblies therebetween and heat conductive potting material disposed between the header on one side and the flex circuit and the mounting bracket on another side.

14. Optical switching apparatus comprising:
a header having a bottom wall and upwardly extending side walls forming a recess, a platform formed along the side walls spaced above the bottom wall;
a micromirror formed from a single piece of material having an outer frame portion lying in a plane and supported on the platform, an intermediate rotational gimbals portion hinged to the frame portion and moveable relative to the frame portion about a first axis and an inner rotational mirror portion having a reflective upper face surface hinged to the gimbals portion for movement of the mirror portion relative to the gimbals portion about a second axis, a single magnet attached to one of the rotational portions;
at least one electromagnetic coil assembly disposed in close proximity to the mirror assembly for applying selected forces to the at least one magnet for causing desired movement of the gimbals portion and the mirror portion along the two axes to reflect an optical beam directed to the mirror portion in a selected direction; and
a plurality of electromagnetic coil assemblies spaced apart adjacent to but out of alignment with the single magnet.

15. Optical switching apparatus comprising:
a header having a bottom wall and upwardly extending side walls forming a recess, a platform formed along the side walls spaced above the bottom wall;
a micromirror formed from a single piece of material having an outer frame portion lying in a plane and supported on the platform, an intermediate rotational gimbals portion hinged to the frame portion and moveable relative to the frame portion about a first axis, the gimbals portion hinged to the frame portion by a pair of hinges spaced apart along the first axis, and an inner rotational mirror portion having a reflective upper face surface hinged to the gimbals portion for movement of the mirror portion relative to the gimbals portion about a second axis, the mirror portion hinged to the gimbals portion by a pair of hinges spaced apart along the second axis, at least one magnet attached to one of the rotational portions the frame portion having spaced apart, inwardly extending stop tabs on either side of the first axis and the gimbals portion having an extension along the first axis fitting closely between the stop tabs to limit motion in the plane in which the gimbals portion lies;
at least one electromagnetic coil assembly disposed in close proximity to the mirror assembly for applying selected forces to the at least one magnet for causing desired movement of the gimbals portion and the mirror portion alone the two axes to reflect an optical beam directed to the mirror portion in a selected direction.

16. Optical switching apparatus according to claim 15 further comprising a projection formed on one of the stop tabs and the extension and extending toward the other of the stop tabs and the extension.

17. Optical switching apparatus comprising:
a header having a bottom wall and upwardly extending side walls forming a recess, a platform formed along the side walls spaced above the bottom wall;

a micromirror formed from a single piece of material having an outer frame portion lying in a plane and supported on the platform, an intermediate rotational gimbals portion hinged to the frame portion and moveable relative to the frame portion about a first axis, the gimbals portion hinged to the frame portion by a pair of hinges spaced apart along the first axis, and an inner rotational mirror portion having a reflective upper face surface hinged to the gimbals portion for movement of the mirror portion relative to the gimbals portion about a second axis, the mirror portion hinged to the gimbals portion by a pair of hinges spaced apart along the second axis, at least one magnet attached to one of the rotational portions the gimbals portion having spaced apart, inwardly extending stop tabs on either side of the second axis and the mirror portion having an extension along the second axis fitting closely between the stop tabs to limit motion in the plane in which the mirror portion lies;

at least one electromagnetic coil assembly disposed in close proximity to the mirror assembly for applying selected forces to the at least one magnet for causing desired movement of the gimbals portion and the mirror portion along the two axes to reflect an optical beam directed to the mirror portion in a selected direction.

18. Optical switching apparatus according to claim 17 further comprising a projection formed on one of the stop tabs and the extension and extending toward the other of the stop tabs and the extension.

19. Optical switching apparatus comprising:

a header having a bottom wall and upwardly extending side walls forming a recess, a platform formed along the side walls spaced above the bottom wall;

a micromirror formed from a single piece of material having an outer frame portion lying in a plane and supported on the platform, an intermediate rotational gimbals portion hinged to the frame portion and moveable relative to the frame portion about a first axis and an inner rotational mirror portion having a reflective upper face surface hinged to the gimbals portion for movement of the mirror portion relative to the gimbals portion about a second axis, at least one magnet attached to one of the rotational portions;

at least one electromagnetic coil assembly disposed in close proximity to the mirror assembly for applying selected forces to the at least one magnet for causing desired movement of the gimbals portion and the mirror portion along the two axes to reflect an optical beam directed to the mirror portion in a selected direction, the at least one electromagnetic coil assembly disposed in engagement with the bottom wall of the header, a respective coil assembly being in alignment with each spaced apart magnet location;

a mounting bracket formed of heat conductive material, the header mounted on the bracket, the bracket being formed with a first portion having a pair of spaced apart surfaces lying in respective planes which intersect each other;

a package having a bottom wall, the bottom wall having an upwardly extending mounting pad formed with a second portion having a pair of complimentary, spaced apart surfaces, one of the first and second portions forming a concave cradle and the other of the first and second portions forming a convex protrusion received in the cradle, the first and second portions being fixed to one another.

20. Optical switching apparatus according to claim 19, in which a bore is formed through the bracket intermediate to the spaced apart surfaces of the first portion and a threaded bore is formed between the pair of complementary, spaced apart surfaces of the second portion and the portions are fixed together by a threaded member received through the bore of the bracket and threaded into the threaded bore.

21. Optical switching apparatus comprising, a header having a bottom wall and upwardly extending side walls forming a recess, a platform formed along the side walls spaced above the bottom wall, a micromirror assembly formed from a single piece of material having an outer frame portion lying in a plane and supported on the platform, and intermediate rotational gimbals portion hinged to the frame portion and movable relative to the frame portion about a first axis, and an inner rotational mirror portion having a reflective upper face surface, hinged to the gimbals portion for movement of the mirror portion relative to the gimbals portion about a second axis, at least one magnet attached to one of the rotational portions, and at least one electromagnetic coil assembly disposed in close proximity to the mirror assembly for applying selected forces to the at least one magnet for causing desired movement of the gimbals portion and the mirror portion along the two axes to reflect an optical beam directed to the mirror portion in a selected direction.

22. A micromirror comprising:

an outer frame portion;

a gimbals portion hinged to said frame portion and rotatable relative to said frame portion about a first axis;

a mirror portion hinged to said gimbals portion and rotatable relative to said gimbals portions about a second axis; and cooperating surfaces to limit motion in the plane of said mirror portion.

23. The micromirror of claim 22, said frame, gimbals, and mirror portions formed from a single piece of material.

24. The micromirror of claim 22, said cooperating surfaces formed on said frame and said gimbals portions.

25. The micromirror of claim 24, said frame and gimbals portions being approximately 100 microns thick, and said cooperating surfaces spaced approximately 10 microns apart.

26. The micromirror of claim 22, said cooperating surfaces formed on said gimbals and said mirror portions.

27. The micromirror of claim 26, said gimbals and said mirror portions being approximately 100 microns thick, and said cooperating surfaces spaced approximately 10 microns apart.

28. The micromirror of claim 22, comprising:

a temporary bridge portion extending between said frame portion and said gimbals portion to limit relative rotation of said frame and gimbals portions during manufacturing of said micromirror.

29. The micromirror of claim 22, comprising:

a temporary bridge portion extending between said gimbals portion and said mirror portion to limit relative rotation of said gimbals and said mirror portions during manufacturing of said micromirror.

30. A micromirror comprising:

an outer frame portion;

a gimbals portion hinged to said frame portion and rotatable relative to said frame portion about a first axis;

a mirror portion hinged to said gimbals portion and rotatable relative to said gimbals portions about a second axis; and at least one pair of magnets on said micromirror, each of said pair of magnets positioned opposite each other on a top and bottom face of one portion of said micromirror.

31. The micromirror of claim 30, each of said pair of magnets positioned opposite each other on a top and bottom face of said gimbals portion, to symmetrically distribute said pair of magnet's mass about an axis of rotation between said frame and gimbals portions.

32. The micromirror of claim 30, each of said pair of magnets positioned opposite each other on a top and bottom face of said mirror portion, to symmetrically distribute said pair of magnet's mass about an axis of rotation between said gimbals and mirror portions.

33. The micromirror of claim 30, said at least one pair of magnets on said micromirror comprising:

at least one first pair of magnets positioned opposite each other on a top and bottom face of said gimbals portion, to symmetrically distribute said first pair of magnet's mass about an axis of rotation between said frame and gimbals portions; and at least one second pair of magnets positioned opposite each other on a top and bottom face of said mirror portion, to symmetrically distribute said second pair of magnet's mass about an axis of rotation between said gimbals and mirror portions.

34. The micromirror of claim 30, comprising:

cooperating surfaces to limit motion in the plane of said mirror portion.

35. The micromirror of claim 34, said frame and gimbals portions being approximately 100 microns thick, said cooperating surfaces spaced approximately 10 microns apart.

36. The micromirror of claim 30, said frame, gimbals, and mirror portions formed from a single piece of material.

37. The micromirror of claim 30, comprising:

a temporary bridge portion extending between said frame portion and said gimbals portion to limit relative rotation of said frame and gimbals portions during manufacturing of said micromirror.

38. The micromirror of claim 30, comprising:

a temporary bridge portion extending between said gimbals portion and said mirror portion to limit relative rotation of said gimbals and said mirror portions during manufacturing of said micromirror.

* * * * *